US 6,676,260 B2
Jan. 13, 2004

(12) United States Patent
Cobb et al.

(54) PROJECTION APPARATUS USING SPATIAL LIGHT MODULATOR WITH RELAY LENS AND DICHROIC COMBINER

(75) Inventors: Joshua M. Cobb, Victor, NY (US); David Kessler, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 48 days.

(21) Appl. No.: 10/131,871

(22) Filed: Apr. 25, 2002

(65) Prior Publication Data

US 2003/0202159 A1 Oct. 30, 2003

(51) Int. Cl.[7] .............................. G03B 21/14
(52) U.S. Cl. .................. 353/31; 353/102; 353/94; 349/5
(58) Field of Search ................... 353/31, 33, 34, 353/37, 102, 100, 94; 349/5, 7, 8

(56) References Cited

U.S. PATENT DOCUMENTS

| 3,202,039 | A | | 8/1965 | Lang et al. |
|---|---|---|---|---|
| 4,441,791 | A | | 4/1984 | Hornbeck |
| 4,836,649 | A | | 6/1989 | Ledebuhr et al. |
| 5,345,262 | A | | 9/1994 | Yee et al. |
| 5,530,489 | A | * | 6/1996 | Henderson et al. ......... 348/757 |
| 5,535,047 | A | | 7/1996 | Hornbeck |
| 5,597,222 | A | | 1/1997 | Doany et al. |
| 5,600,383 | A | | 2/1997 | Hornbeck |
| 5,621,486 | A | | 4/1997 | Doany et al. |
| 5,719,695 | A | | 2/1998 | Heimbuch |
| 5,798,819 | A | | 8/1998 | Hattori et al. |
| 5,808,795 | A | | 9/1998 | Shimomura et al. |
| 5,907,437 | A | | 5/1999 | Sprotbery et al. |
| 5,914,818 | A | | 6/1999 | Tejada et al. |
| 5,918,961 | A | | 7/1999 | Ueda |
| 5,930,050 | A | | 7/1999 | Dewald |
| 5,944,401 | A | | 8/1999 | Murakami et al. |
| 6,008,951 | A | | 12/1999 | Anderson |
| 6,010,121 | A | | 1/2000 | Lee |
| 6,019,474 | A | | 2/2000 | Doany et al. |
| 6,062,694 | A | | 5/2000 | Oikawa et al. |
| 6,067,128 | A | * | 5/2000 | Imai .............................. 349/8 |
| 6,089,717 | A | | 7/2000 | Iwai |
| 6,113,239 | A | | 9/2000 | Sampsell et al. |
| 6,172,813 | B1 | | 1/2001 | Tadic-Galeb et al. |
| 6,183,092 | B1 | * | 2/2001 | Troyer ........................ 353/31 |
| 6,231,192 | B1 | | 5/2001 | Konno et al. |
| 6,247,816 | B1 | | 6/2001 | Cipolla et al. |
| 6,262,851 | B1 | | 7/2001 | Marshall |
| 6,280,035 | B1 | | 8/2001 | Tadic-Galeb et al. |
| 6,542,204 | B1 | * | 4/2003 | Ohzawa et al. ................ 349/5 |

* cited by examiner

Primary Examiner—William Dowling
(74) Attorney, Agent, or Firm—Nelson Adrian Blish

(57) ABSTRACT

A digital projection apparatus (10) for projection of a multicolor image includes a magnifying relay lens assembly (28) as part of the light modulation assembly (38) for each component color. The relay lens assembly (28) increases the effective f/# of incident light to the V-plate assembly (25) or V-prism assembly (27) that serves as dichroic combiner, used to combine modulated light of each color from each light modulation assembly (38) in order to form the multicolor image. The magnifying relay lens assembly (28) also provides a reduced working distance for the projection lens (32), allowing a lower-cost design and facilitating substitution of the projection lens (32) best suited for a display surface (40).

74 Claims, 9 Drawing Sheets

PROJECTION APPARATUS USING SPATIAL LIGHT MODULATOR WITH RELAY LENS AND DICHROIC COMBINER

CROSS REFERENCE TO RELATED APPLICATIONS

Reference is made to commonly-assigned U.S. patent application Ser. No. 09/813,207, filed Mar. 20, 2001, entitled A DIGITAL CINEMA PROJECTOR, by Kurtz et al.; and U.S. patent application Ser. No. 10/050,309, filed Jan. 16, 2002, entitled PROJECTION APPARATUS USING SPATIAL LIGHT MODULATOR, by Joshua M. Cobb, the disclosures of which are incorporated herein.

FIELD OF THE INVENTION

This invention generally relates to a projection apparatus for projecting a digital image that has been formed using a spatial light modulator and more particularly relates to an improved apparatus and method for relaying a multicolor digital image generated at multiple spatial light modulators to a dichroic combining element in the projection path of such a projection apparatus.

BACKGROUND OF THE INVENTION

In order to be considered as suitable replacements for conventional film projectors, digital projection systems must meet demanding requirements for image quality. This is particularly true for multicolor cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1.

The most promising solutions for multicolor digital cinema projection employ, as image forming devices, one of two basic types of spatial light modulators. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). DMDs have been employed in digital projection systems. However, although DMD-based projectors demonstrate some capability to provide the necessary light throughput, contrast ratio, and color gamut, inherent resolution limitations (with current devices providing only 1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,121 (Maki et al.); and U.S. Pat. No. 6,062,694 (Oikawa et al.).

In an electronic projection apparatus using spatial light modulators, individual colors, conventionally red, green, and blue (RGB), are separately modulated in a corresponding red, green, or blue portion of the optical path. The modulated light of each color is then combined in order to form a composite, multicolor RGB color image. There are two basic approaches for projection optics that combine the modulated color light. The first approach, which can be characterized as a convergent approach, is adapted from earlier, conventional projection systems. Using the convergent approach, the component red, green, and blue light have separate axes which are converged by projection optics that effectively bend each light path as necessary in order to form a composite, multicolor color image at some focal plane. As an illustrative example, U.S. Pat. No. 5,345,262 (Yee et al.) discloses a convergent video projection system. Significantly, the disclosure of U.S. Pat. No. 5,345,262 illustrates one of the major problems with the convergent projection approach: namely, that the separate color images must be properly registered on the projection surface. Misregistration or poor focus along any one of the color light projection paths can easily result in an unsatisfactory image. It is instructive to observe that, using this approach, the image paths are converged only at the focus plane.

U.S. Pat. No. 5,907,437 (Sprotbery et al.) discloses an attempt to simplify design complexity and alleviate some of the light path alignment and registration problems inherent to multicolor projection systems using the convergent approach described above. In the U.S. Pat. No. 5,907,437 disclosure, a light valve projection system is described in which a converging optical system converges the red, green, and blue modulated light paths in order to form a converged image, advantageously centered on the axis of a projection lens. The design strategy outlined in U.S. Pat. No. 5,907,437 thus simplifies the projection lens design task for a system using the convergent approach. However, other problems inherent to a convergent approach remain.

One notable problem with approaches similar to that disclosed in U.S. Pat. No. 5,907,437 is a relatively high etendue. As is well known in the optical arts, etendue relates to the amount of light that can be handled by an optical system. Potentially, the larger the etendue, the brighter the image. Numerically, etendue is proportional to the product of two factors, namely the image area and the numerical aperture. Increasing the numerical aperture, for example, increases etendue so that the optical system captures more light. Similarly, increasing the source image size, so that light originates over a larger area, increases etendue and, therefore, brightness. As a general rule, increased etendue results in a more complex and costly optical design. Using an approach such as that outlined in U.S. Pat. No. 5,907,437, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in U.S. Pat. No. 5,907,437, optical components handle a sizable image area, therefore a high etendue, since red, green, and blue color paths are separate and must be optically converged. Moreover, although the configuration disclosed in U.S. Pat. No. 5,907,437 handles light from three times the area of the final multicolor image formed, this configuration does not afford any benefit of increased brightness, since each color path contains only one-third of the total light level. In particular, the second relay lens and the projection lens of a convergent optics system such as that disclosed in U.S. Pat. No. 5,907,437 are inherently constrained by a large etendue, which adds cost and complexity to such a solution. Moreover, the second relay lens must be color corrected over the full visible spectrum. At the same time, different segments of the relay lens and of the projection lens handle different wavelengths, so that localized lens imperfections, dust, or dirt not only affect the projected image, but can impact the color quality. In light, then, of etendue constraints, of color correction requirements, of dust and dirt sensitivity, and of the need for maximizing brightness levels for digital projection, there appear to be significant inherent limitations that hamper the convergent approach exemplified in U.S. Pat. No. 5,907,437.

An alternative approach to projection optics can be characterized as a coaxial approach. In contrast to the convergent approach in which component red, green and blue light beams are bent to converge at a focal plane, the coaxial approach combines the component red, green, and blue modulated light beams along a common axis. In order to do this, the coaxial approach employs a dichroic combining element, such as an X-cube or Philips prism. X-cubes or X-prisms and related dichroic optical elements, such as those disclosed in U.S. Pat. No. 5,098,183 (Sonehara) and U.S. Pat. No. 6,019,474 (Doany et al.) are well known in the optical imaging arts. The dichroic combining element combines modulated light from each color path and folds the color paths together along a common axis in order to provide the combined color image to a projection lens.

Referring to FIG. 1, there is shown a simplified block diagram of a conventional digital projection apparatus 10 using the coaxial approach. Each color path (r=Red, g=Green, b=Blue) uses similar components for forming a modulated light beam. Individual components within each path are labeled with an appended r, g, or b, appropriately. For the description that follows, however, distinctions between color paths are specified only when necessary. Following any of the three color paths, a light source 20 provides unmodulated light, which is conditioned by uniformizing optics 22 to provide a uniform illumination. A polarizing beamsplitter 24 directs light having the appropriate polarization state to a spatial light modulator 30 which selectively modulates the polarization state of the incident light over an array of pixel sites. The action of spatial light modulator 30 forms an image. The modulated light from this image, transmitted along an optical axis $O_r$, $O_g$, $O_b$ through polarizing beamsplitter 24, is directed to a dichroic combiner 26, typically an X-cube or a Philips prism in conventional systems. Dichroic combiner 26 combines the red, green, and blue modulated images from separate optical axes $O_r$, $O_g$, $O_b$ to form a combined, multicolor image for a projection lens 32 along a common optical axis O for projection onto a display surface 40, such as a projection screen.

In contrast to the convergent approach outlined above with reference to U.S. Pat. No. 5,907,437, the coaxial approach, as shown in the block diagram of FIG. 1 and as exemplified in U.S. Pat. No. 5,808,795 (Shimomura et al.) has a number of advantages. With respect to light throughput, the coaxial approach, because it combines light paths along a common axis, does not increase the etendue of the optical system. Instead, with respect to projection lens 32, dichroic combiner 26, by folding the appropriate optical axes $O_r$ and $O_b$ to join with optical axis $O^g$ and form a common optical axis O, optically overlaps the areas of spatial light modulators 30r, 30g, 30b. Thus, the etendue has no increase whether one, two, three, or more spatial light modulators are combined in this way. And since each light color is separately modulated, then combined and provided to projection lens 32 along a common optical axis O, no optical system is required between dichroic combiner 26 and projection lens 32.

A Philips prism, such as that disclosed in U.S. Pat. No. 3,202,039 (DeLang et al.) could alternately be employed as dichroic combiner 26. Familiar to those skilled in the digital image projection arts, Philips prisms have been employed as chromatic separator or combiner components in projector designs such as those disclosed in U.S. Pat. Nos. 6,280,035 and 6,172,813 (both to Tadic-Galeb et al.), U.S. Pat. No. 6,262,851 (Marshall), and U.S. Pat. No. 5,621,486 (Doany et al.), for example.

While digital projection apparatus 10 designed using the basic model of FIG. 1 are able to provide good levels of image quality, there is felt to be room for improvement. Constraints imposed by dichroic coatings are a key consideration. Dichroic coatings used for dichroic combiner 26 can be expensive and difficult to design and fabricate for suitable performance with incident light over a wide range of angles, particularly in projection applications where high brightness levels and a broad color gamut are needed. Dichroic coatings reflect and transmit light as a function of incident angle and wavelength. As the incident angle varies, the wavelength of light that is transmitted or reflected also changes. Where a dichroic coating is used with an optical system having a low f/#, a broad spectrum will be reflected or transmitted by the coating, due to the wide range of incident angles.

FIGS. 2a and 2b illustrate the change in the performance of a dichroic coating as the range of incident light angles increases. Referring to FIGS. 2a and 2b, there is represented a light cone from a point source P and incident to a dichroic surface 36, which is disposed at a diagonal in these Figures. FIGS. 2a and 2b represent light incident to a dichroic surface 36 at two different f/# values. In FIG. 2a, the light cone, having a smaller f/#, is incident to dichroic surface 36 at a larger range of angles. Incident angles are considered with respect to a normal N to dichroic surface 36. Because of the difference between angle A at one extreme of the incident light beam and angle B at the opposite extreme, dichroic surface 36 will cause a color shift to occur across the transmitted and reflected light cones.

By comparison, the light cone is incident at a larger f/# in FIG. 2b. Here, there is very little difference between angles A' and B' at extreme edges of the incident light cone. In such a case, dichroic surface 36 response will cause correspondingly less color shift across the transmitted and reflected light cones than with the smaller f/# shown in FIG. 2a.

As is clear from FIGS. 2a and 2b, dichroic surface 36 has some support structure, typically a prism 42. For minimizing aberrations, the flatness of surfaces 44a and 44b is of more importance with the smaller f/# of FIG. 2a where the light cone presents a wider angular range, than with the larger f/# of FIG. 2b where the light cone presents a smaller angular range. Thus, if a larger f/# light cone can be used, surface tolerance requirements of prism 42 in a dichroic combiner can be relaxed, thereby reducing cost and alignment complexity. However, conventionally, a light cone having a smaller f/# is used in projection systems, since system designs are directed to maximizing brightness.

Related to the benefits of higher f/# illustrated in FIGS. 2a and 2b are the benefits of telecentricity illustrated by comparing FIGS. 2c and 2d. Here, point sources P1, P2, and P3 represent points on a flat image plane, with rays incident on dichroic surface 36. In FIG. 2c, light cones from point sources P1, P2, and P3 are telecentric and corresponding angles C and D are identical. By comparison, in FIG. 2d, the light cones are not telecentric and corresponding angles C' and D' differ. This difference in incident angles can cause P1 to have a slightly different color than P3, thereby producing a color shift over the field.

From FIGS. 2a–2d, it can be seen that there are advantages in providing telecentric light at a small range of incidence angles (that is, at high f/#). However, in practice, it has been shown to be difficult to obtain these advantages for digital projection apparatus, due to the need to maintain high brightness levels at the same time.

As is well known in the imaging arts, in order to maximize color gamut, each composite color should have a narrow spectral range, to provide as pure a saturated color as possible. For example, it would be difficult to produce a deep red color using a red light channel that also includes some green light. Thus, where a low f/# is used with a color-combining prism or other optical element, the broad spectral response of the dichroic coating reduces the color gamut. At the same time, however, a low f/#, because it collects more light at a wider angular range, is desirable for obtaining high brightness levels. While there are conventional corrective techniques for improving color gamut, such as filtering, these techniques can reduce brightness. The limitations of coatings within dichroic combiner 26, then, constrain the capability of projection system 10 optics to optimize both brightness level and color gamut.

FIG. 3a illustrates the response of an idealized X-cube 126 to light directed from a light source P. X-cube 126 comprises four prisms 128a, 128b, 128c, and 128d, having appropriate surface treatments and cemented together. Surfaces 130a and 130b are treated to reflect light from P having the proper wavelength. Surfaces 130a and 130b must be perfectly planar and perfectly aligned with respect to one another to provide aberration-free reflection in order to form an image at point P'. In contrast with FIG. 3a, FIG. 3b shows the response of X-cube 126' in which surfaces 130a and 130b are not perfectly aligned. The misalignment of surfaces 130a and 130b causes light from point source P to form two separate images at points P1' and P2'. Aberration effects, such as the visible seam noted above, would be most noticeable when the distance between image points P1' and P2' is on the order of one pixel width or larger. Clearly, blur in an image that is reflected through X-cube 126' would be increasingly more pronounced with increasing distance, in any direction, between image points P1' and P2'. Correspondingly, the smaller the pixel dimensions, the greater the impact of an aberration due to imperfections in fabrication of X-cube 126'.

Limitations of the familiar X-cube dichroic combiner 26 are inherent in the manufacture of the device itself. The X-cube is assembled from four prisms, with the internal surfaces of each prism having appropriate dichroic coatings. In fabrication, prisms are glued together, with inner surface planes aligned as closely as possible. However, even slight tolerance errors in X-cube fabrication can result in imaging problems when these devices are used with conventional digital projection solutions. For example, slight misalignment of the planar coated surfaces within the X-cube could cause aberrations such as color fringing. Color fringing aberrations can be corrected up to a point; however, there would be an advantages to a dichroic combiner design that was less prone to problems of this type. The "seam" at which dichroic surfaces are combined tends to appear as one or more lines in the displayed image. Fabrication of a high-quality X-cube is further complicated by the requirement that individual component prisms have identical refractive indices; in practice, this is best accomplished when the same glass melt is used for all prism components. In addition, coating processes must be uniform on multiple prism surfaces. Optical coatings applied to X-cube surfaces typically have sub-micron thickness and are multi-layered, sometimes requiring as many as 50 or 60 layers. Thus, careful parts tracking must be carried out in addition to precision fabrication practices. Further problems are a result of the difficulties in providing uniform, flat surfaces on outer faces of the assembled X-cube. It can be well appreciated that this complexity adds considerable cost to the X-cube. Finally, obtaining brightness using conventional approaches results in high heat levels, which can damage adhesives and coating surfaces of the X-cube.

It can be readily appreciated that, in practice, fabrication of a perfect X-cube 126 as in FIG. 3a would be very difficult and some tolerance for error must be allowed. For this reason, it is advantageous, when designing an optical system using an X-cube 126, to minimize dependence on maintaining precise X-cube 126 tolerances.

Of related importance for imaging quality is preserving telecentricity wherever possible in the optical system. When cones of light from two different point source locations on the surface of spatial light modulator 30 are not telecentric, these different locations then present different incident angles to dichroic surfaces in dichroic combiner 26. In response, dichroic combiner 26 reflects different wavelength bands at different field positions, resulting in color shifts across the image. It is well known in the optical design arts that telecentric imaging at spatial light modulator 30 helps to further reduce contrast shading across the image.

As another well known principle in design of projection apparatus, it is beneficial to minimize the retrofocus distance of projection lens 32, thus minimizing the back working distance requirements and cost of projection lens 32. It would be preferable to avoid the cost and complexity requirements of a projection lens having a long back focal length relative to its effective focal length, such as the solution disclosed in U.S. Pat. No. 6,008,951 (Anderson), for example.

U.S. Pat. No. 6,113,239 (Sampsell et al.) discloses an arrangement of projection display components with a hybrid X-cube design that incrementally reduces the back working distance requirement for a projection lens. In this disclosure, both polarizing beamsplitters and dichroic combining surfaces are combined in a single X-cube, shortening the projection lens working distance when compared with other prior art designs. Notably, however, improved brightness is not achieved by the design in U.S. Pat. No. 6,113,239, since the angular constraints of dichroic surfaces have not been alleviated. Other problems include costly coatings solutions, since polarizing beamsplitter coatings are not readily optimized for all color and polarization combinations. Moreover, further improvement in the working distance requirements would be beneficial.

U.S. Pat. No. 5,944,401 (Murakami et al.) discloses, as an alternative to X-cube dichroics, an optical block comprising dichroic surfaces within plastic prisms. This solution provides some relief for back working distance requirements, since the refractive index of plastics exceeds that of air. To minimize back working distance, transmissive spatial light modulators are employed, allowing image-formation as close to the combining optical block as possible. However, this arrangement would not be well-suited for projector apparatus using reflective spatial light modulators, since back working distance requirements are still excessive. In terms of back working distance, the solution of U.S. Pat. No. 5,944,401 is not advantaged over conventional X-cube designs. A sizable projection lens would be required for full-scale cinema projection. Moreover, the solution disclosed in U.S. Pat. No. 5,944,401 does not address the inherent angular limitations of dichroic surfaces described above. Thus, brightness levels are constrained with this type of design solution.

U.S. Pat. No. 5,597,222 (Doany et al.) discloses, for use in a digital projector, an optical relay lens system that alleviates some of the difficulties noted above that relate to inherent tolerance problems and projection lens working requirements. U.S. Pat. No. 5,597,222 discloses the use of a single 1×, double-telecentric relay lens to relay the combined image from individual RGB color paths to a MacNeille polarizing beamsplitter. In U.S. Pat. No. 5,597,222, spatial light modulators are disposed very near a dichroic combiner X-cube, to minimize thereby some of the potential adverse effects of imperfections in outer surface flatness and tolerance errors in inner surface fabrication. However, this solution falls far short of what is needed to compensate for inherent problems with X-cube coatings and surfaces so that both image brightness and color gamut can be maintained. For example, the design noted in the Doany et al. disclosure fails to address inherent angular dependencies in the dichroic coating response, so that it remains difficult to support a large color gamut while maintaining image brightness at the same time. Moreover, the projection lens must also use a high numerical aperture with this design, which implies added cost over designs with lower numerical aperture. Because of the scale of spatial light modulator components, the design of U.S. Pat. No. 5,597,222 is still very dependent on high-quality X-cube design. Further, the arrangement disclosed in U.S. Pat. No. 5,597,222 employs a relatively large number of optical components between a polarizing beamsplitter and its modulating LCD. With a large number of optical components in the path of a polarized illumination source, some unavoidable stress birefringence would necessarily alter the polarization states of both unmodulated and modulated light traveling in both directions, resulting in loss of image contrast.

U.S. Pat. No. 6,247,816 (Cipolla et al.) discloses use of a 1×relay lens for relaying an intermediate image towards a dichroic combiner in only one of the color paths. The solution in U.S. Pat. No. 6,247,816 addresses a component packaging problem, but does not alleviate any of the angular constraints imposed by dichroic combiner response. Neither does the solution in U.S. Pat. No. 6,247,816 provide any relief with respect to back working distance requirements of the projection lens.

U.S. Pat. No. 4,836,649 (Ledebuhr et al.) discloses a 1×relay lens arrangement used in the illumination path to minimize the size of polarization components and in the modulated light path to help alleviate back working distance constraints for a digital projection system. While this arrangement provides some advantages, color-combining dichroic surfaces must still handle light at low f/# values, resulting in reduced color gamut. Moreover, the projection lens must also operate at a low f/# when using this solution.

As is stressed in the disclosure of U.S. Pat. No. 5,374,968 (Haven et al.) the conventional approach for maximizing brightness in projection systems emphasizes low f/# optics. However, as is noted above with reference to FIGS. 2a–2d, the performance of dichroic surfaces used for combining color image paths is hindered by the large incidence angles of low f/# optical systems.

In spite of their high cost and known problems, X-cubes have served as dichroic combiners in a substantial number of imaging device designs. One reason for the widespread use of X-cubes and similar devices relates to their compact size when compared against other solutions using dichroic surfaces. In order to minimize back working distance of the projection lens, conventional design approaches position spatial light modulators closely to the X-cube, as was shown in U.S. Pat. No. 6,113,239, for example.

Strategies for eliminating the X-cube include those disclosed in U.S. Pat. No. 6,231,192 (Konno et al.) Here, dichroic mirrors are employed for combining the light from each color modulation path, with equal optical distances maintained in each light path. The system described provides a less costly solution than conventional solutions using X-cube optics. At the same time, however, the solution disclosed in U.S. Pat. No. 6,231,192 does not alleviate the back working requirements of the projection lens system. This solution limits the f/# of projector optics to slower speeds, constraining the available brightness and requiring larger projection lens diameters. Correction for astigmatism must be provided by cylindrical optics in the projection path.

In summary, conventional approaches to digital projector design make some compromises relative to performance, cost, and complexity in order to provide a high quality image with maximum brightness. The X-cube solution, because of its relative compactness, helps to minimize back working distance requirements for projection lenses, but has inherent performance problems and high cost. It would be advantageous to use less expensive dichroic prisms, but, since these take up more space, this solution complicates projection lens design. Thus, it can be seen that there is a need for improvement in digital projection optics design that alleviates the inherent angular limitations of dichroic coatings while providing maximum brightness and color gamut, minimizes the working distance requirements of projection optics, and allows a high f/# for projection optics, while eliminating the need for a costly X-cube for combining modulated light.

SUMMARY OF THE INVENTION

It is an object of the present invention to provide a projection apparatus for projecting a multicolor image, the apparatus comprising:

(a) a first light modulation assembly for forming a magnified real image having a first wavelength, a second light modulation assembly for forming a magnified real image having a second wavelength, and a third light modulation assembly for forming a magnified real image having a third wavelength, wherein each modulation assembly is similarly constructed and comprises:

(i) a spatial light modulator for modulating incident light from a light source to form a first image; and, (ii) a magnifying relay lens having a relay lens optical axis, the magnifying relay lens focusing the first image towards a dichroic combiner in order to form the magnified real image of the first image along the relay lens optical axis;

(b) the dichroic combiner combining each relay lens optical axis onto a common projection axis, in order to form the multicolor image from the magnified real image having the first wavelength, the magnified real image having the second wavelength, and the magnified real image having the third wavelength, the dichroic combiner comprising a first dichroic surface disposed along the common projection axis at a first oblique angle and, adjacently, a second dichroic surface disposed along the common projection axis at a perpendicular to the first oblique angle, wherein the first and the second dichroic surfaces are not crossed; and (c) a projection lens for projecting the multicolor image toward a display surface.

It is a feature of the present invention that it provides a magnifying relay lens that is double-telecentric, to magnify the image formed by the spatial light modulator and to relay that image to a dichroic combiner. By magnifying the image, the magnifying relay lens effectively allows the dichroic combiner to operate at a higher f/#, accommodating a narrower range of incident angles, thus increasing color gamut across the projected image.

It is an advantage of the present invention that, because it relays modulated light to the dichroic combiner at a lower f/#, it allows use of less expensive dichroic coatings on combiner components.

It is a further advantage of the present invention that it substitutes lower-cost components for a more complex solution using conventional X-cube optics. The design of the present invention increases the amount of space available for color combining dichroic components by relaying a magnified intermediate image for projection.

It is a further advantage of the present invention that it provides a low-cost solution that minimizes heat effects detrimental to dichroic coatings. By eliminating the need for an X-cube, the present invention also minimizes heat problems due to adhesives used in combining components.

It is a further advantage of the present invention that it allows the use of a projection lens having a reduced numerical aperture and a favorable working distance, where the ratio of the effective focal length to the back focal length exceeds 1.0, simplifying lens design. The present invention also allows a projection lens having a higher f/# to provide high brightness. By thus relaxing requirements of the projection lens, the present invention provides cost savings over more demanding designs. In addition, the present invention allows a projector to be designed with interchangeable projection lenses, so that an appropriate projection lens can be easily and economically substituted for a particular display environment. Further, by reducing numerical aperture requirements of the projection lens, the present invention inherently reduces the complexity inherent in the design of anamorphic projection lens elements.

It is a further advantage of the present invention that it provides a solution that does not introduce birefringence to projected light before the light is filtered by a polarizer, thereby preserving contrast ratio.

It is yet a further advantage of the present invention that it enjoys the benefits of brightness and color quality inherent to coaxial optical design and avoids the complex focus problems and lens design concerns of conventional convergent projection apparatus.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
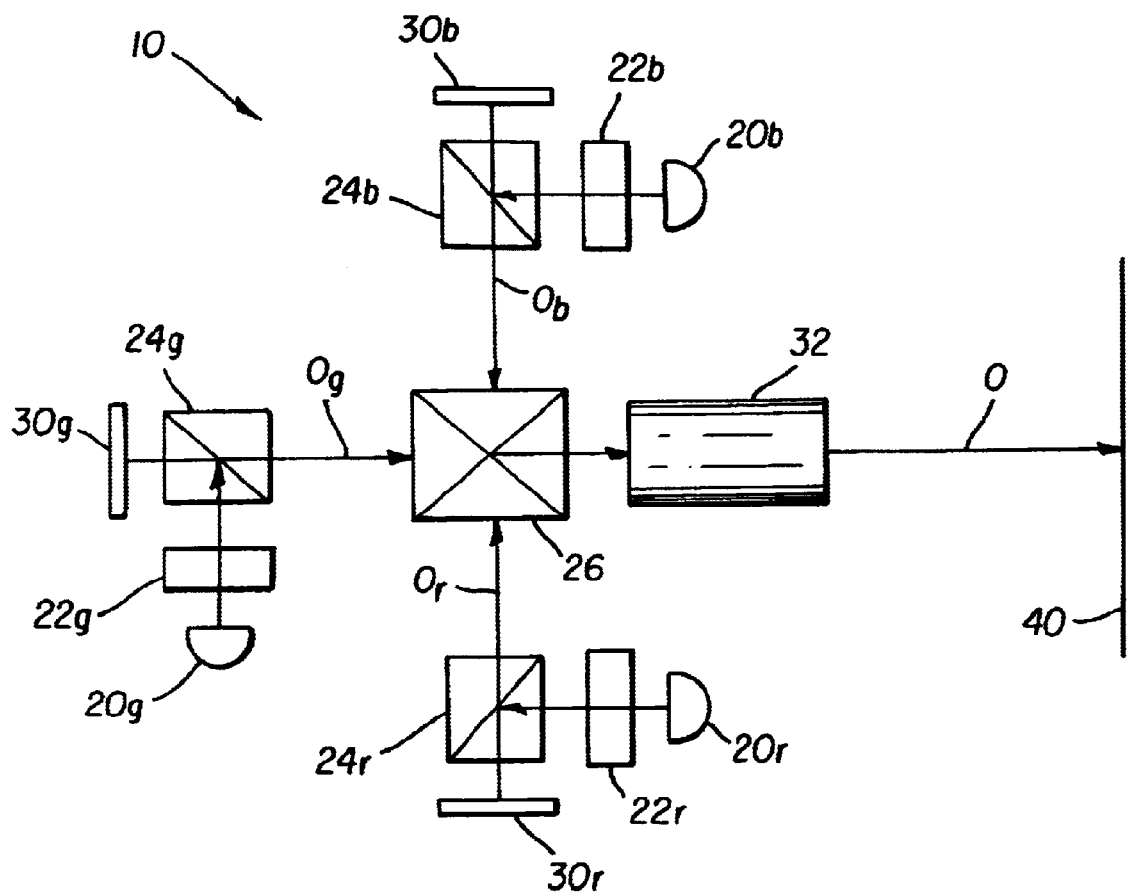
FIG. 1 is a schematic block diagram showing major components of a conventional, prior art digital projection apparatus.
Figure 2A:
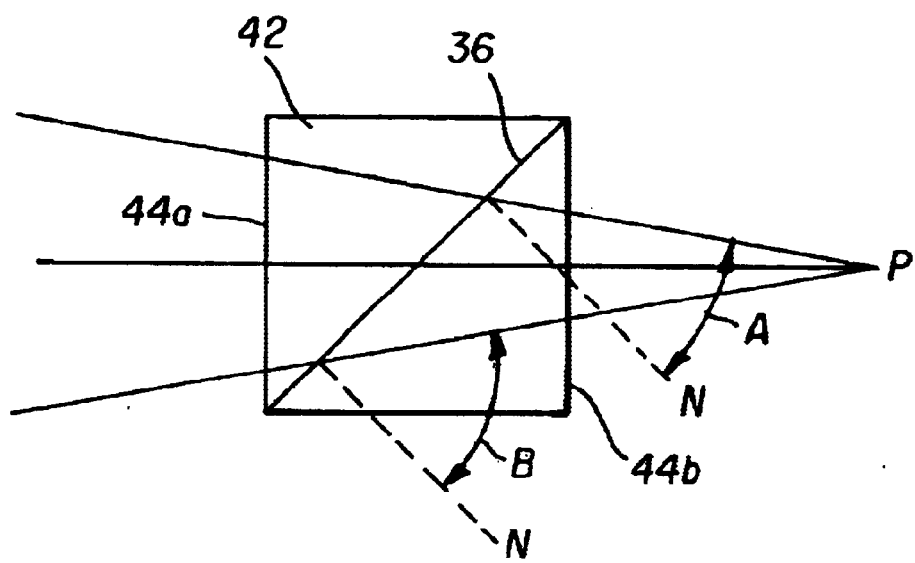
FIGS. 2a and 2b are ray diagrams showing incidence of light upon a dichroic coating at two different f/# values.
Figure 2B:
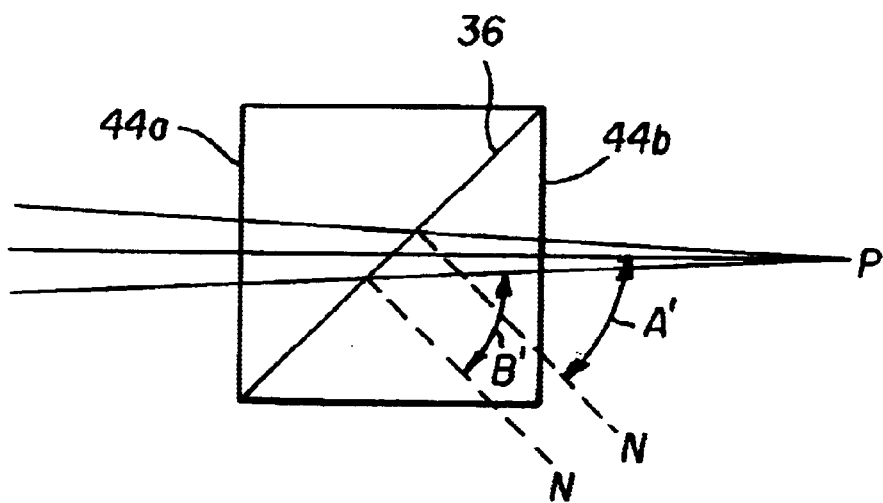
Figure 2C:
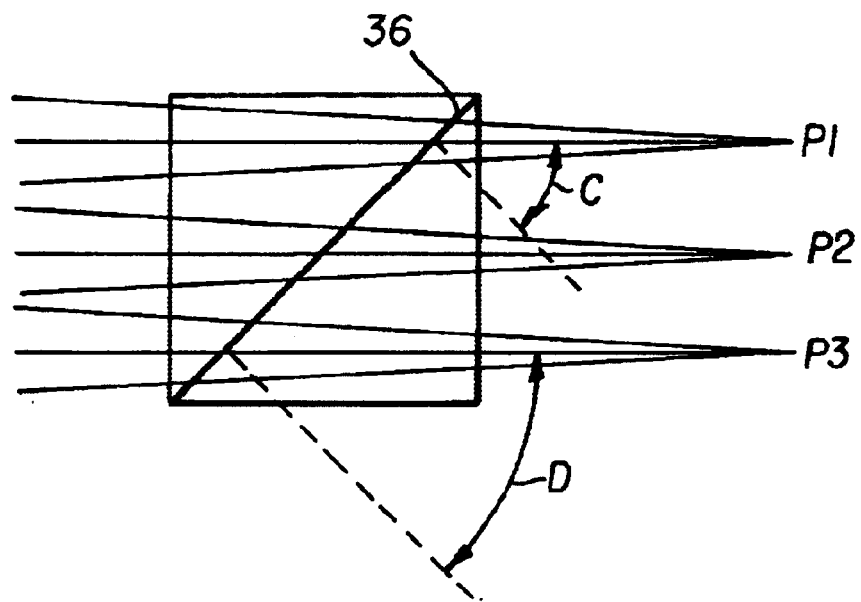
FIGS. 2c and 2c are ray diagrams showing non-telecentric and telecentric light incident upon a dichroic coating.
Figure 2D:
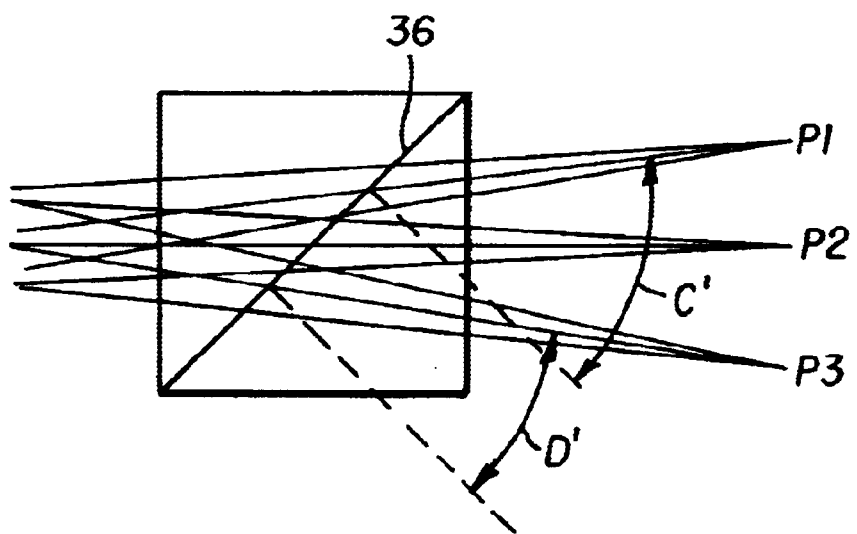
Figure 3A:
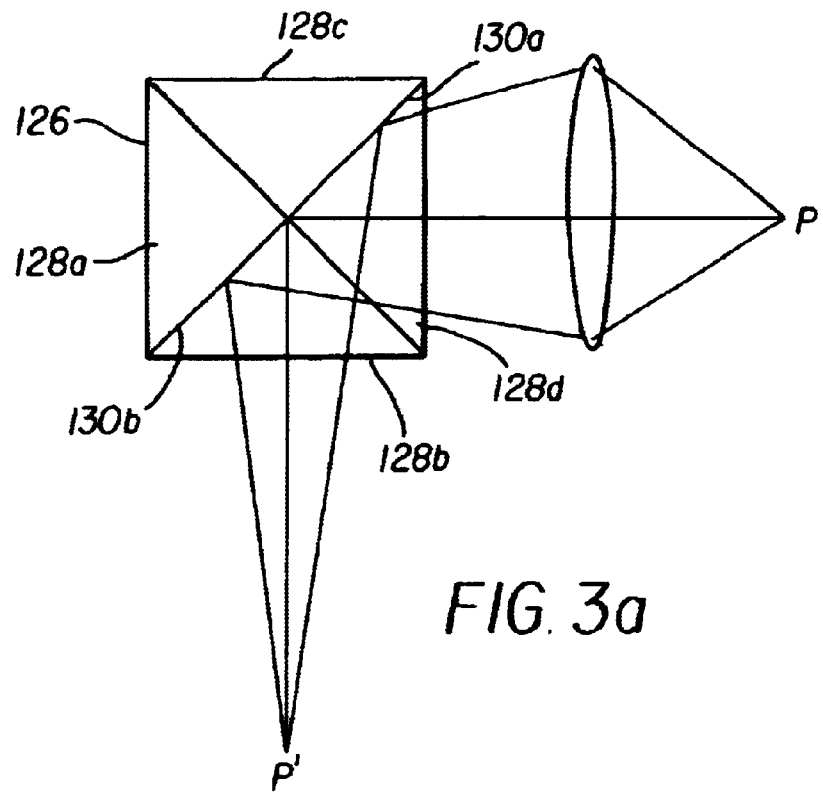
FIG. 3a shows the imaging response of an idealized X-cube.
Figure 3B:
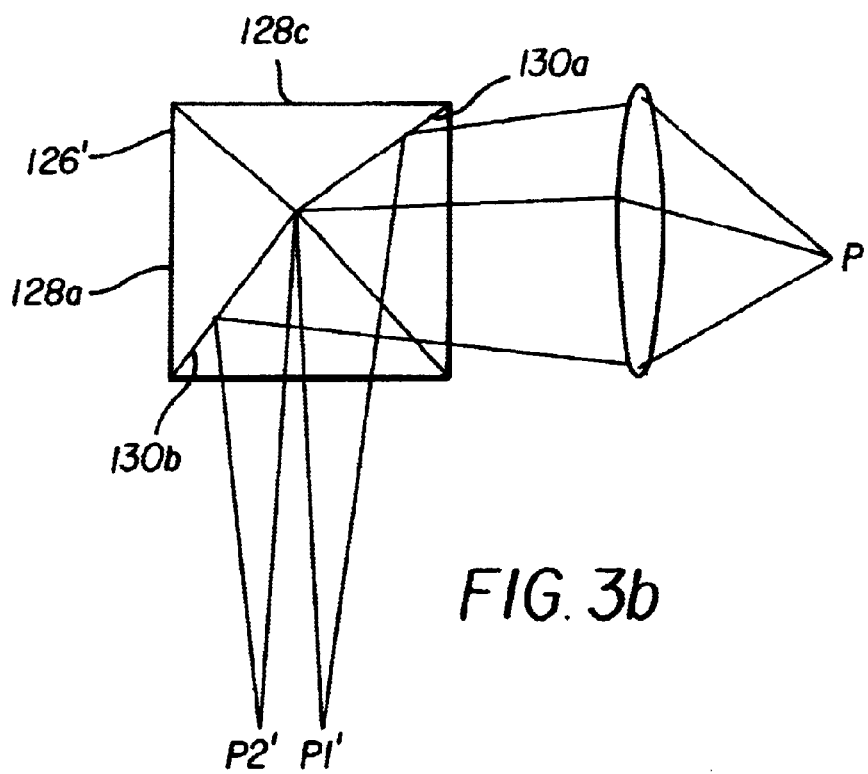
FIG. 3b shows the imaging response of an X-cube having slight misalignment errors.

In light of the description given in the background section above with reference to FIGS. 1 and 2a–2d, a goal of the present invention is to provide light to dichroic combiner 26 in telecentric form at a high f/#, taking advantage of the resulting relaxed requirements on dichroic combiner 26 fabrication while still providing the necessary brightness. The additional description relative to FIGS. 3a and 3b shows that it would be advantageous to provide light to a dichroic combiner where demands on mechanically precise fabrication of the dichroic combiner are minimized.

Figure 4:
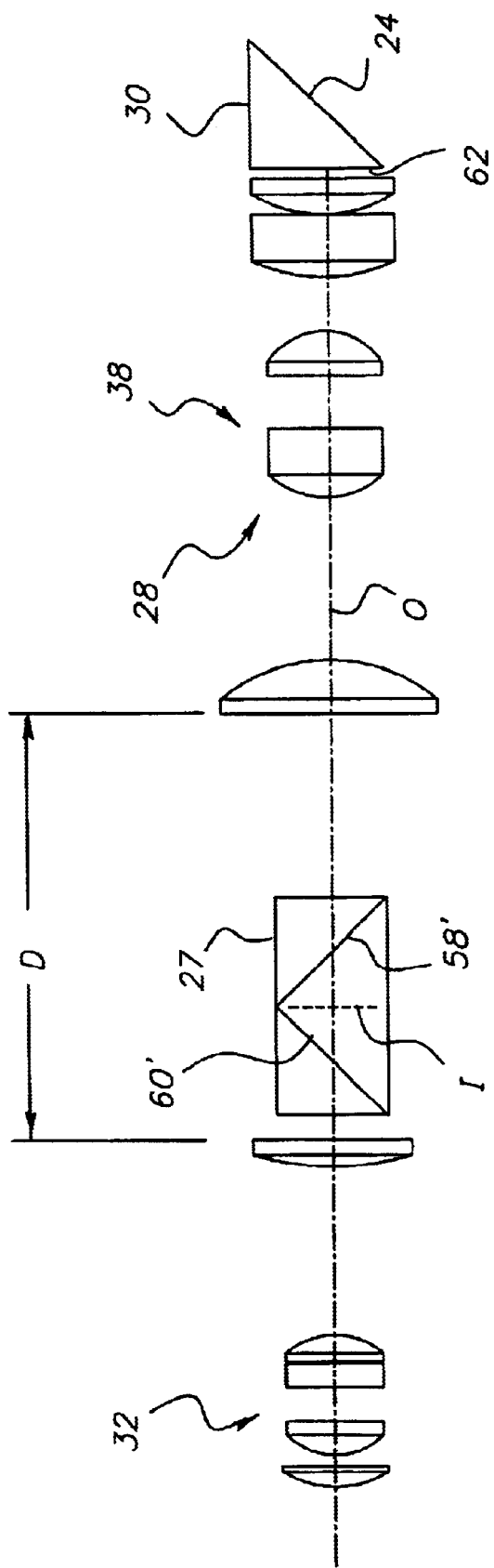
FIG. 4 is a block diagram showing the light modulation assembly of the present invention for a single color.

Referring to FIG. 4, there is shown, in schematic form, an implementation of components used in the green optical path of projection apparatus 10 in the present invention. In each color channel, a light modulation assembly 38 comprises a magnifying relay lens 28 and spatial light modulator 30 that cooperate in order to form a magnified real image I, as appropriate for the color channel. In order to form magnified real image I, magnifying relay lens 28 magnifies, as its optical object, the image that is located on spatial light modulator 30 and reflected from polarizing beamsplitter 24. A polarizer 62 is provided for improving overall image contrast. Magnifying relay lens 28 is double-telecentric, so that the modulated light beam directed along optical axis O to a V-prism assembly 27, which serves as dichroic combiner, is in telecentric form. Because V-prism assembly 27 handles telecentric light, there is minimal tendency for color shading across magnified real image I, due to angular variances. Significantly, by magnifying the image formed on spatial light modulator 30 with some magnification factor greater than 1×, magnifying relay lens 28 also effectively focuses magnified real image I toward V-prism assembly 27 at a higher f/# than 1×relay operation would provide. As a result, first and second dichroic surfaces 58' and 60' within V-prism assembly 27 handle a narrower spectral band and are thereby able to provide a larger color gamut and higher brightness than would be achievable under a lower f/#. Moreover, with the use of magnifying relay lens 28, no light is lost even though a higher f/# is achieved at V-prism assembly 27, since a low f/# is still used at spatial light modulator 30. As a result, an improved magnified real image I is provided, as the output of V-prism assembly 27, along common optical axis O.

The arrangement of FIG. 4 also provides advantages for lowering cost and complexity requirements of a projection lens 32. With the arrangement of FIG. 4, projection lens 32 can advantageously work at a higher f/# in order to project the multicolor image combined from each magnified real image I onto display surface 40 (not shown in FIG. 4). In addition, projection lens 32 needs only a small working distance to project the multicolor image combined from each magnified real image I onto display surface 40. It can be appreciated that distance D between the rear side of projection lens 32 and the front side of magnifying relay lens 28 does not constrain the space available for color combination dichroics when compared against prior art designs such as those exemplified in U.S. Pat. Nos. 5,808,795 and 5,798,819. Instead, with magnified real image I on the long conjugate side of magnifying relay lens 28, distance D can be flexibly determined during design in order to permit the use of less compact and less expensive color-combining prisms or surfaces.

Within V-prism assembly 27, first dichroic surface 58' transmits green light and reflects blue light and second dichroic surface 60' transmits green and blue and reflects red light.

Unlike prior art implementations disclosed in U.S. Pat. Nos. 5,597,222 and 6,247,816 cited above, in which a 1×relay lens is used in the optics path, the apparatus and method of the present invention employ greater than unity magnification by magnifying relay lens 28. With a 2×magnification, for example, magnifying relay lens 28 provides magnified real image I as a 2×image to V-prism assembly 27. This effectively doubles the f/# requirement of the dichroic combiner, for example, easing the performance requirement from a typical value of f/2.5 to f/5. An f/2.5 value can easily be outside the recommended range for coating performance of V-prism assembly 27. However, f/5 is typically well within the recommended range. Using incident modulated light at f/5, first and second dichroic surfaces 58' and 60' within V-prism assembly 27 can form the modulated, multicolor image for projection, providing a large color gamut without color shade degradation. In addition, magnification creates an image with larger pixels, thereby reducing the effect of aberrations due to imperfect manufacture of V-prism assembly 27, as was described above with reference to FIGS. 3a and 3b.

It is instructive to note that magnified real image I can be formed within or near prism assembly 27 along optical axis O. It is most advantageous to form magnified real image I near the center of prism assembly 27, as is shown in FIG. 4. Effectively "encased" within prism assembly 27, magnified real image I is unaffected by dust, smudges, or dirt. Moreover, when magnified real image I is centered within prism assembly 27, the size of prism assembly 27 can be minimized, since the prism components must be sized to capture the full light cone entering and exiting from magnified real image I.

Figure 5:
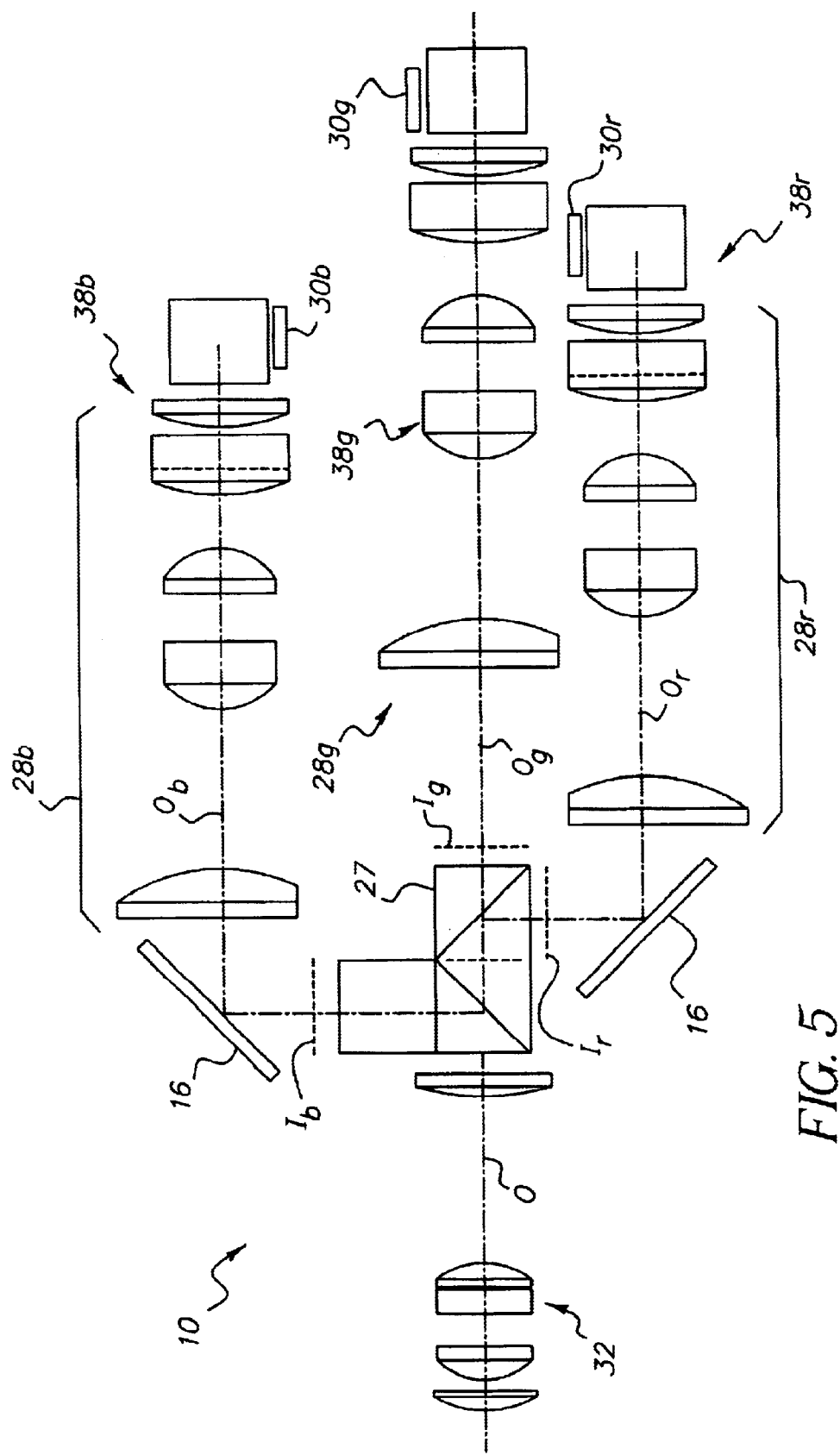
FIG. 5 is a top view showing red, green, and blue light modulation paths in a preferred embodiment.
Figure 6:
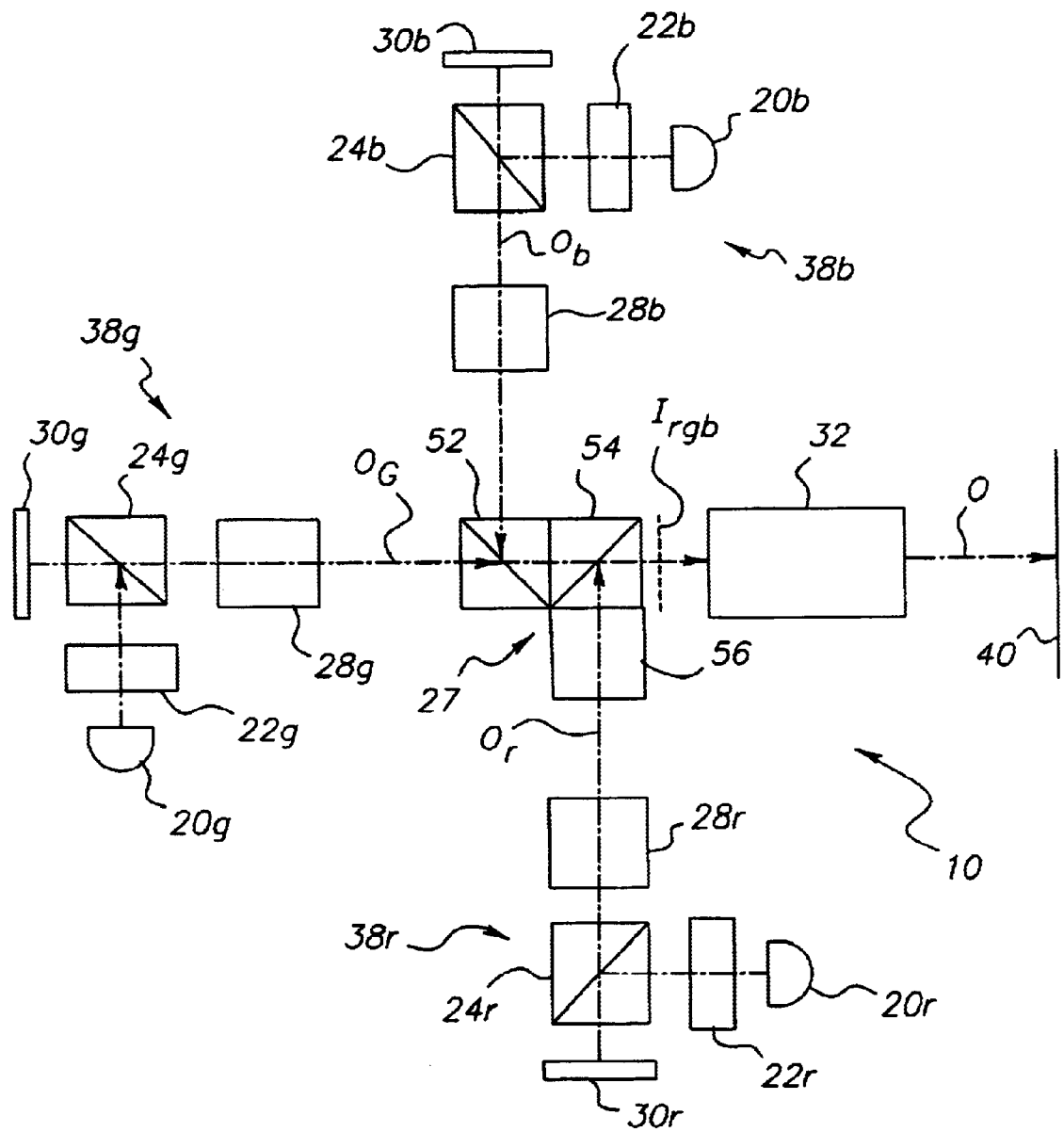
FIG. 6 is a schematic block diagram showing major components of a projection apparatus of the present invention using a prism having internal dichroic surfaces as dichroic combiner.

Recall that FIG. 4 showed the green light path only. Referring to FIGS. 5 and 6, there is shown, as a top view and in schematic form, an arrangement of red, green, and blue light modulation assemblies 38r, 38g, 38b and components in a preferred embodiment of projection apparatus 10. Within each red, green, or blue light modulation assembly 38r, 38g, 38b, the initial modulated light cone output from spatial light modulator for red, green, or blue 30r, 30g, 30b is relayed along red, green, or blue optical axis $O_r$, $O_g$, $O_b$ by magnifying relay lens 28r, 28g, 28b to provide its red, green, or blue magnified real image $I_r$, $I_g$, or $I_b$ near or within the dichroic combiner, V-prism assembly 27, or near or within a V-plate assembly 25 as is shown iii FIG. 7. In the particular arrangement shown in FIG. 5, blue and red optical axes $O_b$ and $O_r$ of light modulation assemblies 38b and 38r are folded at mirrors 16. V-prism assembly 27 or, optionally, V-plate assembly 25 combines the three different magnified real images $I_r$, $I_g$, and $I_b$ by selective reflection of the red and blue fight and by transmission of the green light, forms combined multicolor magnified image $I_{rgb}$ along common optical axis O at its output. Projection lens 32 then projects combined multicolor magnified image $I_{rgb}$ onto display surface 40, as shown in FIG. 6. Comparing FIGS. 5 and 6, note that multicolor magnified image $I_{rgb}$ may be formed at any suitable location within or in the vicinity of V-prism assembly 27 or, optionally, V-plate assembly 25. The ideal location for combined multicolor magnified image $I_{rgb}$, as was described above with reference to FIG. 4, is centered within prism assembly 27.

It is instructive to note that, from the perspective of projection lens 32, combined multicolor magnified image $I_{rgb}$ may be a real image or a virtual image, depending on where the individual magnified real images $I_r$, $I_g$, and $I_b$ are formed relative to the spatial position of dichroic combiner V-plate assembly 25 or V-prism assembly 27. Combined multicolor magnified image $I_{rgb}$ forms a real color combined image whenever the individual magnified real images $I_r$, $I_g$, and $I_b$ are formed between the front surface of V-plate assembly 25 or V-prism assembly 27 and the rear of projection lens 32. This arrangement is indicated by the position of combined multicolor magnified image $I_{rgb}$ in FIG. 6. In contrast, if the individual magnified real images $I_r$, $I_g$ and $I_b$ are formed between the front surface of relay lens 28 and the front surface of V-plate assembly 25 or V-prism assembly 27, combined multicolor magnified image $I_{rgb}$ is a virtual color combined image with respect to projection lens 32. That is, there is no actual 20 spatial "location" of combined multicolor magnified image $I_{rgb}$ in such a case.

Instead, V-plate assembly 25 or V-prism assembly 27 operates to combine the individual magnified real images $I_r$, $I_g$, and $I_b$ as a virtual combined multicolor magnified image $I_{rgb}$.

Whether combined multicolor magnified image $I_{rgb}$ is a real image or a virtual image, projection lens 32 is then designed with the necessary back focal length for projecting combined multicolor magnified image $I_{rgb}$ to display surface 40, from wherever combined multicolor magnified image $I_{rgb}$ is formed. Projection lens 32 may alternately incorporate an anamorphic attachment for adjusting the aspect ratio of the projected image, as is well known in the image projection arts.

The high f/# requirements, smaller relative size, reduced number of components, and relaxed dimensional tolerances made possible by the present invention reduce the cost and complexity of projection lens 32 design for digital projection. Projection lens 32 can therefore be designed to be easily interchangeable, such as for different screen sizes for example.

In a preferred embodiment, polarizing beamsplitter 24 is a wire-grid beamsplitter with a reflective LCD as spatial light modulator 30. A conventional MacNeille polarizing beamsplitter or equivalent component could be substituted for polarizing beamsplitter 24.

Figure 7:
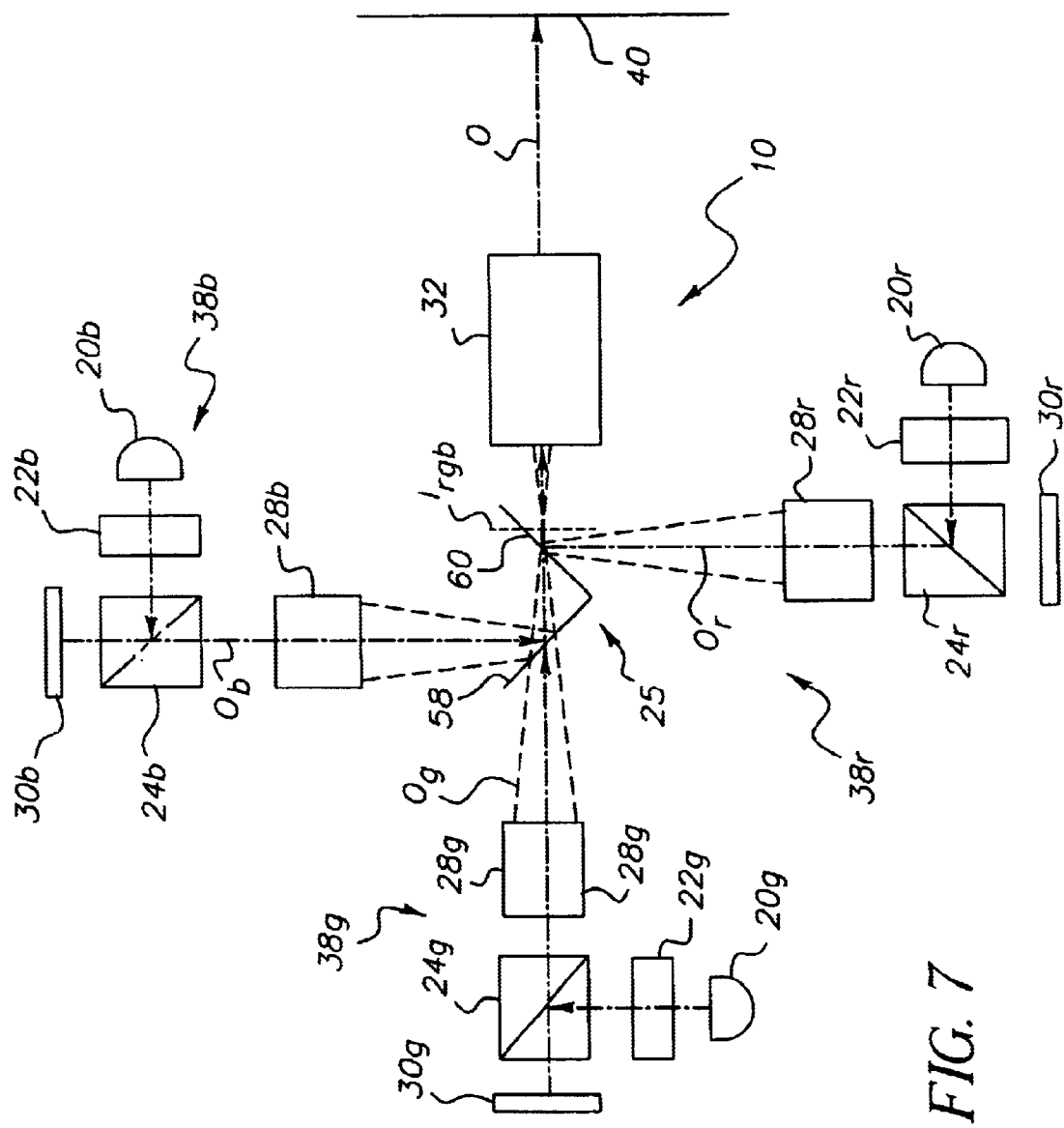
FIG. 7 is a schematic block diagram showing major components of an alternative embodiment of a projection apparatus of the present invention using dichroic surfaces arranged at oblique angles with respect to the optical axis and perpendicular to each other.

Comparing FIGS. 6 and 7, observe that V-prism assembly 27 can be replaced by V-plate assembly 25, which operates similarly. Both V-prism assembly 27 and V-plate assembly 25 comprise a pair of planar dichroic surfaces, disposed adjacently but not crossed, and oriented at right angles to each other. Notably, V-prism assembly 27, by using glass which has a higher refractive index than air, is advantageous for further shortening the back focal distance required for projection lens 32. The use of glass prisms, as opposed to plates, also tends to reduce aberrations, particularly axial coma and astigmatism. V-prism assembly 27 encases first dichroic surface 58' within a first cube 52 and second dichroic surface 60' within a second cube 54. Glass cube 56 is also provided in order to provide an equal path length for red light modulation assembly 38r.

Whether V-prism assembly 27 or V-plate assembly 25 is used, the preferred arrangement is to provide equal optical path lengths for red, green, and blue light modulation assemblies 38r, 38g, and 38b. Otherwise, it would be difficult to form combined multicolor magnified image $I_{rgb}$ at a single location.

Figure 8:
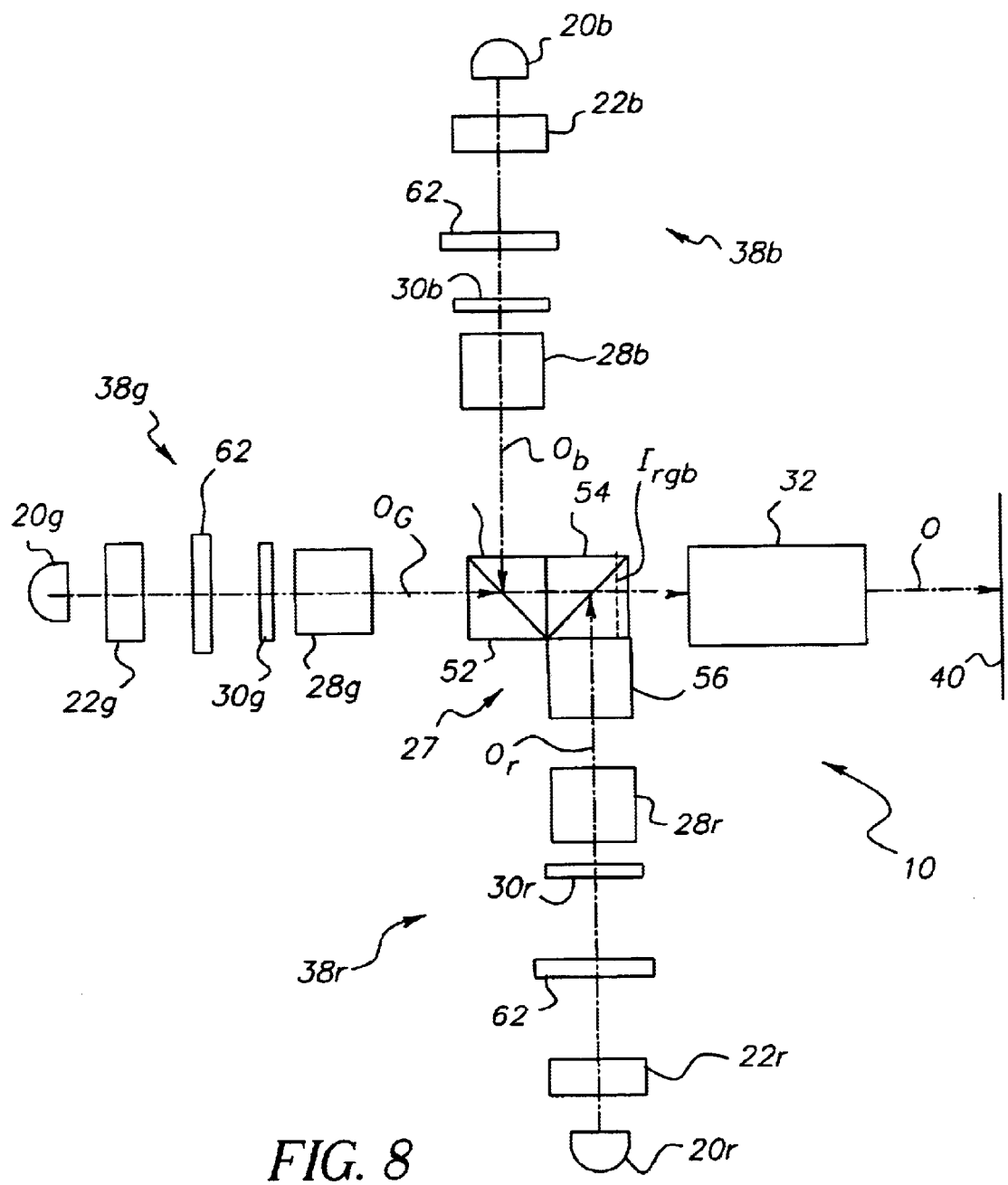
FIG. 8 is a schematic block diagram showing major components of another alternative embodiment of the present invention using a transmissive LCD as spatial light modulator.

Spatial light modulator 30 could alternately be a transmissive LCD, with appropriate adaptations to the imaging optics path, as is shown in the schematic block diagram of FIG. 8. For a transmissive LCD, uniformized light from light source 20 and uniformizing optics 22, polarized by polarizer 62, would provide suitable light for modulation by spatial light modulator 30. As is represented in FIG. 8, each component R, G, and B light path would have a parallel structure with the arrangements of FIGS. 5, 6, and 7, with only a minor redistribution of components within each light modulation assembly 38.

As yet another alternative, a DMD could be used as spatial light modulator 30 with appropriate adaptations to the imaging optics path, such as substitution of a total internal reflection (TIR) beamsplitter for polarizing beamsplitter 24, as is well known in the digital projection art.

The present invention allows the use of any suitable type of illumination system for providing source colored light for modulation by spatial light modulators 30. Light sources 20 could include lamps, filters, LEDs, lasers or other illumination components. The preferred embodiment uses a Xenon arc lamp as a white light source, with dichroic separators disposed to filter the source illumination in order to provide substantially pure red, green, and blue color light sources 20r, 20g, and 20b for modulation, following light separation techniques well known in the projection imaging arts. For simplicity in the figures of this disclosure, and because prior art methods for providing color light are widely known, the illumination system used to provide light sources 20r, 20g, and 20b is not shown.

Use of digital projection apparatus 10 of the present invention, or applying the methods of the present invention, relaxes the performance, dimensional, and mechanical tolerance requirements for the dichroic combiner used to form combined multicolor magnified image $I_{rgb}$ for projection. By increasing the f/# of the optical system, the apparatus and methods of the present invention thereby reduce the range of angles incident upon dichroic surfaces. This results in improved gamut, without compromising brightness. This arrangement also reduces the numerical aperture and relaxes back working distance requirements for projection lens 32, thereby reducing the cost and complexity of projection lens 32 design. High contrast can be maintained using the design of the present invention, since magnifying relay lens 28 components, not disposed in the path of the polarized illumination source that is required for LCD spatial light modulators 30, do not contribute to birefringence in the illumination light.

Because each color path has its own separate magnifying relay lens 28, there is no need for broadband color correction for lens components between spatial light modulator 30 and projection lens 32. Any of magnifying relay lenses 28r, 28g, or 28b can be independently color corrected, if advantageous for the performance of projection apparatus 10; alternately, any two or all three of magnifying relay lenses 28r, 28g, or 28b could be of identical manufacture, thereby reducing fabrication and design costs. Demands on precision fabrication of dichroic surfaces 58 or 58' and 60 or 60' are also relaxed due to magnification of the image presented at the input to V-plate assembly 25 or V-prism assembly 27 and due to the telecentricity of magnifying relay lens 28. With these improvements, then, the present invention boosts the imaging performance of projection apparatus 10 and allows simpler, more compact optical design at minimal cost.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the amount of magnification provided by magnifying relay lens 28 can be any value greater than 1×, and should be suitably matched to the characteristics of other components in the imaging path. Not shown or described in detail are a number of additional supporting polarization components conventionally used to improve contrast and performance of LCD spatial light modulators 30.

Thus, what is provided is an improved projection apparatus and method for digital image projection in which an image generated at a spatial light modulator is relayed to a dichroic combining assembly using a magnifying, double-telecentric relay lens.

PARTS LIST

10. Digital projection apparatus
16. Mirror
20. Light source
20r. Light source, red
20g. Light source, green
20b. Light source, blue
22. Uniformizing optics
22r. Uniformizing optics, red
22g. Uniformizing optics, green
22b. Uniformizing optics, blue
24. Polarizing beamsplitter
24r. Polarizing beamsplitter, red
24g. Polarizing beamsplitter, green
24b. Polarizing beamsplitter, blue
25. V-plate assembly
26. Dichroic combiner
27. V-prism assembly 28. Magnifying relay lens
28r. Magnifying relay lens, red
28b. Magnifying relay lens, green
28g. Magnifying relay lens, blue
30. Spatial light modulator
30r. Spatial light modulator, red
30g. Spatial light modulator, green
30b. Spatial light modulator, blue
32. Projection lens
36. Dichroic surface
38. Light modulation assembly
38r. Light modulation assembly, red
38g. Light modulation assembly, green
38b. Light modulation assembly, blue
40. Display surface
42. Prism
44a. Surface
44b. Surface
52. First cube
54. Second cube
56. Glass cube
58. First dichroic surface
58'. First dichroic surface
60. Second dichroic surface
60'. Second dichroic surface
62. Polarizer
126. X-cube
126'. X-cube
128a. Prism
128b. Prism
128c. Prism
128d. Prism
130a. Surfaces
130b. Surfaces

What is claimed is:

1. A projection apparatus for projecting a multicolor image, the apparatus comprising:
   (a) a first light modulation assembly for forming a magnified real image having a first wavelength, a second light modulation assembly for forming a magnified real image having a second wavelength, and a third light modulation assembly for forming a magnified real image having a third wavelength, wherein each modulation assembly is similarly constructed and comprises:
      (i) a spatial light modulator for modulating incident light from a light source to form a first image; and,
      (ii) a magnifying relay lens having a relay lens optical axis, said magnifying relay lens focusing said first image towards a dichroic combiner in order to form said magnified real image of said first image along said relay lens optical axis;
   (b) said dichroic combiner combining each of said relay lens optical axes onto a common projection axis, in order to form said multicolor image from said magnified real image having said first wavelength, said magnified real image having said second wavelength, and said magnified real image having said third wavelength, said dichroic combiner comprising a first dichroic surface disposed along said common projection axis at a first oblique angle and, adjacently, a second dichroic surface disposed along said common projection axis at a perpendicular to said first oblique angle, wherein said first and said second dichroic surfaces are not crossed; and
   (c) a projection lens for projecting said multicolor image.

2. A projection apparatus according to claim 1 wherein said first wavelength is red, said second wavelength is green, and said third wavelength is blue.

3. A projection apparatus according to claim 1 wherein each of said spatial light modulators is a reflective LCD.

4. A projection apparatus according to claim 1 wherein each of said spatial light modulators is a transmissive LCD.

5. A projection apparatus according to claim 1 wherein each of said spatial light modulators is a digital micromirror device.

6. A projection apparatus according to claim 1 wherein each of said light sources comprises a lamp.

7. A projection apparatus according to claim 1 wherein each of said light sources comprises a color filter.

8. A projection apparatus according to claim 1 wherein each of said light sources comprises a laser.

9. A projection apparatus according to claim 1 wherein each of said light sources comprises an LED.

10. A projection apparatus according to claim 1 further comprising a dichroic separator for providing said light source.

11. A projection apparatus according to claim 1 further comprising a polarizer for conditioning the light from each of said light sources.

12. A projection apparatus according to claim 1 wherein s each of aid magnifying relay lens provides 2× magnification.

13. A projection apparatus according to claim 1 wherein each of said magnifying relay lens is double-telecentric.

14. A projection apparatus according to claim 3 wherein said first light modulation assembly, second light modulation assembly, and third light modulation assembly each further comprise a polarizing beamsplitter for directing said incident light having a predetermined polarization state to each of said spatial light modulators and for directing each of said first images to each of said magnifying relay lens.

15. A projection apparatus according to claim 14 wherein said polarizing beamsplitter is a wire-grid polarizing beamsplitter.

16. A projection apparatus according to claim 1 wherein said first light modulation assembly, second light modulation assembly, and third light modulation assembly each further comprise a polarizer.

17. A projection apparatus according to claim 1 wherein said magnifying relay lens for said first light modulation assembly is fabricated to be substantially identical to said magnifying relay lens for said second light modulation assembly.

18. A projection apparatus according to claim 1 wherein said multicolor image formed by said dichroic combiner is a real color-combined image.

19. A projection apparatus according to claim 1 wherein said multicolor image formed by said dichroic combiner is a virtual color-combined image.

20. A projection apparatus according to claim 1 wherein each of said magnified real images of said first image is focused prior to said dichroic combiner along said relay lens optical axis.

21. A projection apparatus according to claim 1 wherein each of said magnified real images of said first image is focused within said dichroic combiner along said relay lens optical axis.

22. A projection apparatus according to claim 1 wherein each of said magnified real images of said first image is focused following said dichroic combiner along said relay lens optical axis.

23. A projection apparatus for projecting a multicolor image comprising:
   (a) a first light modulation assembly for forming a magnified real image having a first wavelength, a second light modulation assembly for forming a magnified real image having a second wavelength, and a third light modulation assembly for forming a magnified real image having a third wavelength, wherein each modulation assembly is similarly constructed and comprises:
   (i) a spatial light modulator for modulating incident light from a light source to form a first image; and,
   (ii) a magnifying relay lens having a relay lens optical axis for focusing said first image along said relay lens optical axis;
(b) a dichroic combiner for combining each of said relay lens optical axes onto a common projection axis, in order to form said multicolor image from said magnified real image having said first wavelength, said magnified real image having said second wavelength, and said magnified real image having said third wavelength, said dichroic combiner comprising a first prism having a first internal dichroic surface disposed along said common projection axis at a first oblique angle and, adjacently, a second prism having a second internal dichroic surface disposed along said common projection axis at a perpendicular to said first oblique angle, and, adjacent to said second prism, a third prism for equalizing the optical path length; and
(c) a projection lens for projecting said multicolor image toward a display surface.

24. A projection apparatus according to claim 23 wherein said first wavelength is red, said second wavelength is green, and said third wavelength is blue.

25. A projection apparatus according to claim 23 wherein each of said spatial light modulators is a reflective LCD.

26. A projection apparatus according to claim 23 wherein each of said spatial light modulators is a transmissive LCD.

27. A projection apparatus according to claim 23 wherein each of said spatial light modulators is a digital micromirror device.

28. A projection apparatus according to claim 23 wherein each of said light sources comprises a lamp.

29. A projection apparatus according to claim 23 wherein each of said light sources comprises a color filter.

30. A projection apparatus according to claim 23 wherein each of said light sources comprises a laser.

31. A projection apparatus according to claim 23 wherein each of said light sources comprises an LED.

32. A projection apparatus according to claim 23 further comprising dichroic separators for providing each of said light source.

33. A projection apparatus according to claim 23 further comprising polarizers for conditioning the light from each of said light sources.

34. A projection apparatus according to claim 23 wherein each of said magnifying relay lens provides 2× magnification.

35. A projection apparatus according to claim 23 wherein each of said magnifying relay lens is double-telecentric.

36. A projection apparatus according to claim 23 wherein said first light modulation assembly, second light modulation assembly, and third light modulation assembly each further comprise a polarizing beamsplitter for directing said incident light having a predetermined polarization state to said spatial light modulator and for directing said first image to said magnifying relay lens.

37. A projection apparatus according to claim 36 wherein said polarizing beamsplitter is a wire-grid polarizing beamsplitter.

38. A projection apparatus according to claim 23 wherein said first light modulation assembly, second light modulation assembly, and third light modulation assembly each further comprise a polarizer.

39. A projection apparatus according to claim 23 wherein said magnifying relay lens for said first light modulation assembly is fabricated to be substantially identical to said magnifying relay lens for said second light modulation assembly.

40. A projection apparatus according to claim 23 wherein said multicolor image formed by said dichroic combiner is a real color-combined image.

41. A projection apparatus according to claim 23 wherein said multicolor image formed by said dichroic combiner is a virtual color-combined image.

42. A projection apparatus according to claim 23 wherein each of said magnified real images of each of said first image is focused prior to said dichroic combiner along each of said relay lens optical axis.

43. A projection apparatus according to claim 23 wherein each of said magnified real images of said first image is focused within said dichroic combiner along each of said relay lens optical axis.

44. A projection apparatus according to claim 23 wherein each of said magnified real images of each of said first images is focused following said dichroic combiner along each of said relay lens optical axis.

45. A projection apparatus for projecting a multicolor image, the apparatus comprising:
(a) a first light modulation assembly for forming a magnified real image having a first wavelength, a second light modulation assembly for forming a magnified real image having a second wavelength, and a third light modulation assembly for forming a magnified real image having a third wavelength, wherein each modulation assembly is similarly constructed and comprises:
   (i) a light source
   (ii) a polarizing beamsplitter which transmits light from said light source having a first polarization and reflecting light having a second polarization;
   (iii) a liquid crystal device for modulating incident light having said second polarization to form a first image; and,
   (iv) a magnifying relay lens having a relay lens optical axis lens for focusing said first image to form said magnified real image of said first image along said relay lens optical axis;
(b) a dichroic combiner for combining each of said relay lens optical axes onto a common projection axis, in order to form said multicolor image from said magnified real image having said first wavelength, said magnified real image having said second wavelength, and said magnified real image having said third wavelength, said dichroic combiner comprising a first prism having a first internal dichroic surface disposed along said common projection axis at a first oblique angle and, adjacently, a second prism having a second internal dichroic surface disposed along said common projection axis at a perpendicular to said first oblique angle, and, adjacently, a third prism for equalizing the optical path length; and
(c) a projection lens for projecting said multicolor image toward a display surface.

46. A projection apparatus according to claim 45 wherein said first wavelength is red, said second wavelength is green, and said third wavelength is blue.

47. A projection apparatus according to claim 45 wherein each of said light sources comprises a lamp.

48. A projection apparatus according to claim 45 wherein each of said light sources comprises a color filter.

49. A projection apparatus according to claim 45 wherein each of said light sources comprises a laser.

50. A projection apparatus according to claim 45 wherein each of said light sources comprises an LED.

51. A projection apparatus according to claim 45 further comprising a dichroic separator for providing each of said light sources.

52. A projection apparatus according to claim 45 further comprising a polarizer for conditioning light from each of said light sources.

53. A projection apparatus according to claim 45 wherein each of said magnifying relay lens provides 2× magnification.

54. A projection apparatus according to claim 45 wherein each of said magnifying relay lens is double-telecentric.

55. A projection apparatus according to claim 45 wherein said first light modulation assembly, second light modulation assembly, and third light modulation assembly each further comprise a polarizer.

56. A projection apparatus according to claim 45 wherein said magnifying relay lens for said first light modulation assembly is fabricated to be substantially identical to said magnifying relay lens for said second light modulation assembly.

57. A projection apparatus according to claim 45 wherein said multicolor image formed by said dichroic combiner is a real color-combined image.

58. A projection apparatus according to claim 45 wherein said multicolor image formed by said dichroic combiner is a virtual color-combined image.

59. A projection apparatus according to claim 45 wherein said polarizing beamsplitter is a wire grid beamsplitter.

60. A projection apparatus according to claim 45 wherein each of said magnified real images of each of said first images is focused prior to said dichroic combiner along said relay lens optical axis.

61. A projection apparatus according to claim 45 wherein each of said magnified real images of said first image is focused within said dichroic combiner along said relay lens optical axis.

62. A projection apparatus according to claim 45 wherein each of said magnified real images of said first image is focused following said dichroic combiner along each of said relay lens optical axis.

63. A method for projecting a multicolor image toward a display surface comprising:
   (a) forming a first magnified real image from a first incident light having a first wavelength comprising the steps of:
      (a1) modulating said first incident light of said first wavelength at a first spatial light modulator to form a first image;
      (a2) magnifying and relaying said first image along a first optical axis and toward a first dichroic surface to form said magnified real image having said first wavelength;
   (b) forming a second magnified real image from a second incident light of a second wavelength comprising the steps of:
      (b1) modulating said second incident light of said second wavelength at a second spatial light modulator to form a second image;
      (b2) magnifying and relaying said second image along a second optical axis and toward said first dichroic surface to form said second magnified real image;
   (c) forming a third magnified real image from a third incident light of a third wavelength comprising the steps of:
      (c1) modulating said third incident light of said third wavelength at a third spatial light modulator to form a third image;
      (c2) magnifying and relaying said third image along a third optical axis and toward a second dichroic surface to form said third magnified real image, said second dichroic surface perpendicular to but not crossing said first dichroic surface;
   (d) combining, at said first dichroic surface, said first optical axis and said second optical axis onto a common optical axis, and combining, at said second dichroic surface, said third optical axis onto said common optical axis, in order to combine said magnified real image having said first wavelength, said magnified real image having said second wavelength, and said magnified real image having said third wavelength, thereby forming a multicolor image for projection; and
   (e) projecting said multicolor image toward said display surface.

64. The method of claim 63 wherein the step of modulating said first incident light of said first wavelength comprises the step of modulating an LCD spatial light modulator.

65. The method of claim 63 wherein the step of modulating said first incident light of said first wavelength comprises the step of modulating a digital micromirror device.

66. The method of claim 63 wherein said first incident light of said first wavelength is from a lamp.

67. The method of claim 63 wherein said first incident light of said first wavelength is from a laser.

68. The method of claim 63 wherein said first incident light of said first wavelength is from an LED.

69. The method of claim 63 wherein the step of modulating said first incident light of said first wavelength comprises the step of modulating a red light, wherein the step of modulating said second incident light of said second wavelength comprises the step of modulating a green light, and wherein the step of modulating said third incident light of said third wavelength comprises the step of modulating a blue light.

70. The method of claim 63 wherein said first dichroic surface is contained within a first prism and said second dichroic surface is contained within a second prism.

71. The method of claim 63 wherein the step of forming said multicolor image for projection comprises the step of forming said multicolor image between said first dichroic surface and said second dichroic surface.

72. The method of claim 63 wherein the step of forming said multicolor image for projection comprises the step of forming said multicolor image before said first dichroic surface.

73. The method of claim 63 wherein the step of forming said multicolor image for projection comprises the step of forming said multicolor image after said second dichroic surface along said common optical axis.

74. A projection apparatus for projecting a multicolor image comprising:
   (a) a first light modulation assembly for forming a first magnified image having a first wavelength comprising:
      (i) a first spatial light modulator for modulating incident light from a first light source to form a first image;
      (ii) a first magnifying relay lens having a first relay lens optical axis for focusing said first image to form said first magnified real image;

(b) a second light modulation assembly for forming a second magnified real image having a second wavelength comprising:
  (i) a second spatial light modulator for modulating incident light from a second light source to form a second image;
  (ii) a second magnifying relay lens having a second relay lens optical axis for focusing said second image to form said second magnified real image;

(c) a third light modulation assembly for forming a third magnified real image having a third wavelength comprising:
  (i) a third spatial light modulator for modulating incident light from a third light source to form a third image;
  (ii) a third magnifying relay lens having a third relay lens optical axis for focusing said third image to form said third magnified real image;

(d) a dichroic combiner for combining each of said relay lens optical axes onto a common projection axis, in order to form said multicolor image from each of said magnified real images, said dichroic combiner comprising a first dichroic surface disposed along said common projection axis at a first oblique angle and, adjacently, a second dichroic surface disposed along said common projection axis at a perpendicular to said first oblique angle, wherein said first and said second dichroic surfaces are not crossed; and (e) a projection lens for projecting said multicolor image.

* * * * *